United States Patent Office 2,859,219
Patented Nov. 4, 1958

2,859,219
HYDROCARBON-SOLUBLE PHTHALOCYANINE DYES

David I. Randall, New Vernon, N. J., and Tellis A. Martin, Evansville, Ind., assignors to General Aniline & Film Corporation, New York, N. Y., a corporation of Delaware No Drawing. Application February 20, 1956
Serial No. 566,368

6 Claims. (Cl. 260—314.5)

The invention here presented is a new form of phthalocyanine dye which is of high tinctorial power, improved, brilliant, color, highly stable, and hydrocarbon-soluble; and the process for making it.

The phthalocyanine dyes or pigments are well known, and are articles of commerce for which there is a substantial demand. However, to the present it has not been found possible to prepare hydrocarbon-soluble phthalocyanine dyes, which are satisfactory as colorants as well as hydrocarbon soluble.

According to the present invention it is now found that if the chloro-methylated copper phthalocyanine dyes or pigments are treated with alkyl aromatic compounds, a reaction occurs by which hydrogen chloride is split out and the alkyl aromatic residue is combined into the phthalocyanine molecule in such a way as to make the material hydrocarbon soluble without injuring or decreasing its tinctorial power, stability or any of the other valuable characteristics of the original phthalocyanine dye or pigment. Other objects and details of the invention will be apparent from the following description:

Copper phthalocyanine and the other metal phthalocyanines are well known as high grade pigments and colorants and the chloro-methylated derivatives are also well known as is shown in U. S. Patent 2,435,307. Both the phthalocyanine itself and the chloro-methylated phthalocyanine are substantially insoluble in water, insoluble in dilute acid and insoluble in hydrocarbons, and soluble only in concentrated sulfuric acid.

It is now found that if the chloro-methylated copper phthalocyanine and the like is heated for a number of hours with an alkyl aromatic compound, in an inert solvent, a reaction occurs for the liberation of hydrogen chloride, which leaves the solution, and the formation of another phthalocyanine derivative in which the primary phthalocyanine nucleus contains not only the methylated nucleus, but also the alkyl aromatic nucleus in addition, which serves to make the compound hydrocarbon-soluble while water and alcohol insoluble.

The reactions involved are well shown by the following equations:

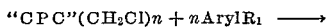

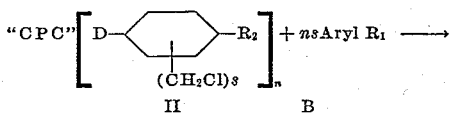

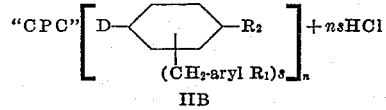

where "CPC" stands for the nucleus of a copper phthalocyanine; $n$ for a numeral between 2 and 6; aryl for an aromatic nucleus such as benzene, naphthalene, thiophene, furan, etc., which aryl nucleus may be further substituted by halogen or $CH_3$; $R_1$ for one or more alkyl groups which are at least two carbons in length; $R_2$ for H, methyl, or ethyl; D for S, O, CO, $SO_2$, $CH_2S$, $CH_2SO_2$ or $CH_2O$; and $s$ for 1 or 2.

A few of the alkyl aromatic compounds useful in this reaction include nonylbenzene, dodecylbenzene, butyl- and di-butylnaphthalene, capryl and di-capryl naphthalene, "mixed" di-alkylnaphthalenes, octyl- and di-octyl-thiophene, butyl- and di-butylthiophene, etc.

The reaction may be carried out by heating at 40–150° C. for one to six hours, the alkyl aromatic compound and a chloro-methylated copper or other phthalocyanine in an inert solvent, such as nitrobenzene, di-chloro- or trichlorobenzene, etc. and in the presence of a suitable catalyst, such as stannic chloride. The resulting dyestuffs or pigments can be precipitated from the reaction mixture by addition of a non-solvent (such as ethanol) which is miscible with the reaction medium but in which the desired dyestuff or pigment is insoluble. The precipitated product is collected on a filter, washed, first with ethanol and then water, and dried in an oven. Further purification can be effected by dissolving in a hydrocarbon solvent, filtering the solution and precipitating the product by diluting with ethanol.

It is surprising that these dyestuffs possess good solubility in hydrocarbon solvents and exhibit good lightfastness. Thus these products are suitable for coloring gasoline, for oily printing inks, and the hydrophobic resinous polymers, especially of the polyvinyl series, such as polystyrene.

The following examples will show the essence of the invention:

Example 1

To a mixture of 40 g. of dodecylbenzene, 150 ml. of dry nitrobenzene, and 8 ml. of stannic chloride there were added, under mechanical stirring, 8 g. of copper tetrachloromethylphthalocyanine. The reaction mixture was heated slowly under reflux to 115° C. Then the temperature was maintained at 115–125° C. for four hours. The crude product was isolated by diluting the cooled reaction mixture with 1 liter of ethanol, filtering, washing first with ethanol and then water and drying at 80–90° C. in an oven. The yield was 17.5 g. of blue solid. It was purified by solution in warm benzene, filtering, diluting with ethanol, collecting the precipitated product on a filter, washing with ethanol and drying; to give 8.5 g. This dyestuff is valuable as a coloring matter for gasoline, for printing inks, and hydrophobic resinous polymers, especially of the polyvinyl series, such as polystyrene. It exhibits excellent light fastness.

Example 2

Instead of dodecylbenzene there is employed 30 g. of nonylbenzene; 10.5 g. of crude solid or 9 g. of purified solid. The properties of this product parallel those of the above one, except for somewhat less solubility in hydrocarbon solvents.

Example 3

To a mixture consisting of 35 g. of amylnaphthalene, 150 ml. of dry nitro-benzene, 200 ml. of dry trichlorobenzene, and 7 ml. of stannic chloride there was added 12 g. of copper tetra (chloromethyl)-tetra-(4-tolylsulfonyl) phthalocyanine (as shown in U. S. P. 2,542,328). The reaction was carried out as described in Example 1; to yield 18 g. of oil soluble greenish-blue solid pigment.

Example 4

A mixture of 25 g. of dibutylthiophene, 150 ml. of dry dichlorobenzene, 6 ml. of stannic chloride and 10 g. of copper tetra (4-methyl-dichloromethylphenylmercapto)

phthalocyanine was heated slowly to 80° C. Then the heating period was continued at 80–90° C. for three hours. The product was isolated in the usual manner; to yield 13 g. of hydrocarbon soluble green solid pigment.

In a similar fashion the linkage D may be substituted by O, CO, $CH_2S$, $CH_2SO_2$ or $CH_2O$.

The above description points out the preparation of a hydrocarbon soluble colorant starting with copper phthalocyanines and the copper phthalocyanine is preferred since it gives the brightest, purest color and is usually the lowest in price. However, the reaction is a general one and practically any of the metals may be used in place of copper; particularly nickel, iron, cobalt, magnesium, aluminum, zinc and the like.

It may be noted that there is possible a substantial range of the amount of chloromethylation ranging from about 2 chloromethyl substituents to 16, and the amount of subsequent aryl aromatic compound reacted into the phthalocyanine molecule depends to a large extent upon the number of chloromethyl substituents.

In addition, the reaction preferably utilizes only the chloromethyl substituent since large substituents are added with so much difficulty that the cost becomes unreasonable.

By the process of the invention it thus becomes possible to produce a hydrocarbon-soluble phthalocyanine dyestuff or pigment which is of equally good tinctorial power, stability, color, and the like compared to the primary dye with the added and unexpected characteristic that it is highly hydrocarbon-soluble.

Where there are above disclosed but a limited number of embodiments of the process of the invention it is possible to provide still other embodiments without departing from the inventive concept herein disclosed; and it is therefore desired that only such limitation be imposed upon the appended claims as are stated therein or required by the prior art.

The invention claimed is:

1. A process for preparing a hydrocarbon-soluble phthalocyanine dye comprising the steps of suspending a copper tetra chloro-methyl phthalocyanine in a mixture consisting essentially of dichlorobenzene as inert solvent, stannic chloride as catalyst, and dodecylbenzene, heating the mixture above 100° C. for 4 hours, cooling the mixture, adding to the cooled mixture a non-aqueous non-solvent for the dye, and filtering out the precipitated dyestuff.

2. A hydrocarbon-soluble phthalocyanine colorant comprising a phthalocyanine nucleus having a central copper atom linked therein and a plurality of dodecylbenzene substituents linked thereto through a carbon atom.

3. A hydrocarbon-soluble phthalocyanine colorant comprising a phthalocyanine nucleus having a central copper atom linked therein and a plurality of nonylbenzene substituents linked thereto through a carbon atom.

4. A hydrocarbon-soluble phthalocyanine colorant comprising a phthalocyanine nucleus having a central copper atom linked therein and a plurality of dibutylthiophene substituents linked thereto through a carbon atom.

5. A process for preparing a hydrocarbon-soluble phthalocyanine dye comprising the steps of suspending a copper tetra chloro-methyl phthalocyanine in a mixture consisting essentially of dichlorobenzene as inert solvent, stannic chloride as catalyst, and nonyl benzene, heating the mixture above 100° C. for 4 hours, cooling the mixture, adding to the cooled mixture a non-aqueous non-solvent for the dye, and filtering out the precipitated dyestuff.

6. A process for preparing a hydrocarbon-soluble phthalocyanine dye comprising the steps of suspending a copper tetra chloro-methyl phthalocyanine in a mixture consisting essentially of dichlorobenzene as inert solvent, stannic chloride as catalyst, and dibutyl thiophene, heating the mixture above 100° C. for 3 hours, cooling the mixture, adding to the cooled mixture a non-aqueous non-solvent for the dye, and filtering out the precipitated dyestuff.

References Cited in the file of this patent

UNITED STATES PATENTS

| | | |
|---|---|---|
| 2,153,740 | Whittier et al. | Apr. 11, 1939 |
| 2,513,098 | Kropa et al. | June 27, 1950 |
| 2,547,972 | Randall et al. | Apr. 10, 1951 |
| 2,604,476 | Jones | July 22, 1952 |
| 2,795,583 | Martin et al. | June 11, 1957 |
| 2,795,584 | Martin et al. | June 11, 1957 |

FOREIGN PATENTS

| | | |
|---|---|---|
| 745,465 | Germany | Dec. 14, 1944 |
| 869,105 | Germany | Mar. 21, 1953 |
| 431,591 | Italy | Mar. 2, 1948 |
| 296,546 | Switzerland | Feb. 15, 1954 |